US011142190B2

(12) United States Patent
Lim

(10) Patent No.: US 11,142,190 B2
(45) Date of Patent: Oct. 12, 2021

(54) SYSTEM AND METHOD FOR CONTROLLING AUTONOMOUS DRIVING VEHICLE

(71) Applicant: NHN Entertainment Corporation, Gyeonggi-do (KR)

(72) Inventor: Chuljae Lim, Gyeonggi-do (KR)

(73) Assignee: NHN ENTERTAINMENT CORPORATION, Gyeonggi-Do (KR)

( * ) Notice: Subject to any disclaimer, the term of this patent is extended or adjusted under 35 U.S.C. 154(b) by 435 days.

(21) Appl. No.: 16/168,808

(22) Filed: Oct. 23, 2018

(65) Prior Publication Data
US 2019/0118805 A1     Apr. 25, 2019

(30) Foreign Application Priority Data

Oct. 24, 2017   (KR) ........................ 10-2017-0138192

(51) Int. Cl.
*B60W 30/09*     (2012.01)
*G05D 1/00*      (2006.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC .. B60W 30/09; B60W 40/09; B60W 30/0953; B60W 30/0956; G05D 1/0088;
(Continued)

(56) References Cited

U.S. PATENT DOCUMENTS 7,894,951 B2 *  2/2011  Norris .................. G05D 1/0061
                                               701/36
8,965,621 B1 *  2/2015  Urmson ..................... B60T 7/22
                                               701/23
(Continued)

FOREIGN PATENT DOCUMENTS

JP          2015-722          1/2015
JP        2015-179445         10/2015
(Continued)

OTHER PUBLICATIONS

Office Action dated Mar. 29, 2019 for Korean Patent Application No. 10-2017-0138192 and its English machine translation by Google Translate.
(Continued)

*Primary Examiner* — Thomas Ingram
(74) *Attorney, Agent, or Firm* — Ladas & Parry, LLP

(57) ABSTRACT

A system of controlling an autonomous driving vehicle may include one or more processors; and memory storing executable instructions that, if executed by the one or more processors, configure the one or more processors to: execute a tutorial for recognizing a driving pattern of a driver, obtaining training data when the tutorial performs training of the driver, storing information associated with the driving pattern of the driver based on the obtained training data, and controlling autonomous driving of the autonomous driving vehicle based on the information associated with the driving pattern of the driver.

20 Claims, 11 Drawing Sheets

(51) Int. Cl.
  *B60W 40/09* (2012.01)
  *G07C 5/00* (2006.01)
  *B60W 30/095* (2012.01)
  *G05D 1/02* (2020.01)

(52) U.S. Cl.
  CPC ........... *B60W 40/09* (2013.01); *G05D 1/0088* (2013.01); *G05D 1/0221* (2013.01); *G05D 1/0223* (2013.01); *G07C 5/008* (2013.01); *G05D 2201/0213* (2013.01)

(58) Field of Classification Search
  CPC .............. G05D 1/0221; G05D 1/0223; G05D 2201/0213; G07C 5/008; G09B 9/04
  See application file for complete search history.

(56) References Cited

U.S. PATENT DOCUMENTS

| | | | | |
|---|---|---|---|---|
| 10,850,741 | B2* | 12/2020 | Alasry | B60W 10/20 |
| 2011/0254655 | A1* | 10/2011 | Maalouf | G09B 9/04 |
| | | | | 340/3.1 |
| 2013/0179382 | A1* | 7/2013 | Fritsch | B60W 50/14 |
| | | | | 706/46 |
| 2019/0084578 | A1* | 3/2019 | Alasry | B60W 60/0015 |
| 2019/0228571 | A1* | 7/2019 | Atsmon | G06T 19/006 |
| 2020/0215917 | A1* | 7/2020 | Schoning | B60W 50/14 |

FOREIGN PATENT DOCUMENTS

| | | |
|---|---|---|
| KR | 10-2017-0057084 | 5/2017 |
| KR | 10-1736306 | 5/2017 |
| KR | 10-2017-0078096 | 7/2017 |

OTHER PUBLICATIONS

Office Action dated Oct. 30, 2019 for Korean Patent Application No. 10-2017-0138192 and its English machine translation by Google Translate.

* cited by examiner

SYSTEM AND METHOD FOR CONTROLLING AUTONOMOUS DRIVING VEHICLE

CROSS REFERENCE TO RELATED APPLICATION

The present application claims the priority to Korean Patent Application No. 10-2017-0138192 filed in the Korean Intellectual Property Office on Oct. 24, 2017, the entire contents of which are incorporated herein by reference.

BACKGROUND

1. Technical Field

Some exemplary embodiments of the present disclosure relate to a technology for controlling an autonomous driving vehicle using a driver's driving pattern and gathering information related to an accident involved with the autonomous driving vehicle.

2. Description of the Related Art

With the development of an advanced technology and the Information Technology (IT) industry, the research and development and application of automation industries are performed in various field. Specifically, the vehicle industry is recently changing into an eco-friendly and advanced vehicle to which the IT technologies have been grafted. In line with the development of the vehicle technology, intelligent vehicles to which accident prevention, accident avoidance, collision safety, convenience improvement, vehicle informatization, and an autonomous driving technology for a driver's safety and convenience enhancement have been applied is commercialized. Such an intelligent vehicle may be a vehicle supporting convenience functions through a support technology for a driver's carelessness or negligent manipulation, voice recognition, etc., and it can reduce accidents attributable to a driver's mistake and also expect a reduced time, fuel waste, and reduced exhaust.

For example, an autonomous driving vehicle is an assembly of intelligent vehicle technologies, and may generate an optimal path from a current location to a desired destination and perform driving without a special manipulation when a driver rides on the vehicle and designates the destination. However, it is not easy to handle an accidental situation occurring in the autonomous driving vehicle because the autonomous driving of the autonomous driving vehicle is controlled according to the basic or preset policy of a supplier without feedback from a user. In a current technology, some accidental situations may be handled or prevented by a manual manipulation of a driver who is present in the autonomous driving vehicle, but it is difficult to determine who is responsible for the accident related to the autonomous driving vehicle.

Accordingly, there is a need for a technology for clarifying where the responsibility for an accident lies when the accident occurs to an autonomous driving vehicle in preparation for the commercialization of an intelligent vehicle.

Korean Patent Application Publication No. 10-2017-0078096 and Korean Patent Application Publication No. 10-2014-0106939 describe some examples of autonomous driving vehicle systems, the entire content of which is incorporated herein by reference.

SUMMARY

Various exemplary embodiments of the present disclosure may provide an accident avoidance method, system and computer program for clarifying where the responsibility for an accident lies with respect to an accidental situation during autonomous driving of an autonomous driving vehicle.

According to some exemplary embodiments of the present disclosure, training data obtained through the training of a driver according to a tutorial may be patterned and used for the autonomous driving of the autonomous driving vehicle.

According to certain exemplary embodiments of the present disclosure, a method of avoiding an accident in an autonomous driving vehicle may be performed by an accident avoidance server. The method may include executing a tutorial for recognizing a driving pattern of the a driver or storing information about or associated with the driving pattern of the driver, obtaining training data when the tutorial performs training of the driver, storing information about or associated with the driving pattern of the driver based on the obtained training data, and controlling the autonomous driving of the autonomous driving vehicle based on the information about or associated with the driving pattern of the driver.

In some exemplary embodiments of the present disclosure, the controlling the autonomous driving may include providing or using information related to autonomous driving generated or controlled based on the driving pattern information stored in the autonomous driving vehicle as evidence for accident avoidance when the autonomous driving vehicle has an accident with another vehicle, pedestrian, objects or buildings.

In certain exemplary embodiments of the present disclosure, the controlling the autonomous driving may include extracting the driving pattern information obtained based on, or through, the tutorial when surrounding situations are recognized through the autonomous driving vehicle, and controlling the autonomous driving vehicle based on the extracted driving pattern information.

In various exemplary embodiments of the present disclosure, the controlling the autonomous driving may include calculating collision prediction information between the autonomous driving vehicle and at least one other vehicle being driven around, ahead of or behind the autonomous driving vehicle and controlling speed of the autonomous driving vehicle in order to maintain a specific distance from the at least one other vehicle being driven around, ahead of or behind the autonomous driving vehicle based on the calculated collision prediction information.

In various exemplary embodiments of the present disclosure, the controlling the autonomous driving may include sensing whether the driver manually drives the autonomous driving vehicle and controlling the autonomous driving vehicle based on control data input based on the manual driving of the driver.

In some exemplary embodiments of the present disclosure, the storing the information about or associated with the driving pattern of the driver may include estimating reference data of each of the training data from or through the tutorial and storing the information about or associated with the driving pattern of the driver based on the estimated reference data.

In certain exemplary embodiments of the present disclosure, the executing the tutorial may include generating a virtual situation by producing at least one scenario for storing the information about the driving pattern of the driver and reproducing the generated virtual situation.

In various exemplary embodiments of the present disclosure, the executing the tutorial may include providing question (and/or answer) information for storing the information about the driving pattern of the driver as the tutorial and receiving an answer related to the question (and/or answer) information from the driver.

In some exemplary embodiments of the present disclosure, the executing the tutorial may include providing a driving situation in which the autonomous driving vehicle is driven on a road in real time as the tutorial.

In certain exemplary embodiments of the present disclosure, the executing the tutorial may include reproducing the virtual situation based on augmented reality or virtual reality through a display installed on the autonomous driving vehicle or associated with the autonomous driving vehicle.

In various exemplary embodiments of the present disclosure, the executing the tutorial may include executing the virtual situation when the autonomous driving vehicle is determined to be in a non-driving, non-operating or stop state.

In some exemplary embodiments of the present disclosure, the executing the tutorial may include executing the tutorial when authentication on the driver is performed based on identification information of the driver.

According to some exemplary embodiments of the present disclosure, a computer program stored in a computer-readable recording medium in order to execute a method of avoiding an accident in an autonomous driving vehicle may be provided. The computer program may include instructions of executing a tutorial for recognizing a driving pattern of a driver or storing information about the driving pattern of the driver for the vehicle, obtaining training data when the tutorial performs training of the driver, storing the information about or associated with the driving pattern of the driver based on the obtained training data, and controlling the autonomous driving of the autonomous driving vehicle based on the information about or associated with the driving pattern of the driver.

According to some exemplary embodiments of the present disclosure, an accident avoidance server of an autonomous driving vehicle may be provided. The server may include a tutorial execution unit configured to execute a tutorial for recognizing a driving pattern of a driver or storing information about or associated with the driving pattern of the driver for the vehicle, an acquisition unit configured to obtain training data when the tutorial performs the training of the driver or when the training of the driver is performed through the tutorial, a pattern information storage unit configured to store the information about or associated with the driving pattern of the driver based on the obtained training data, and an autonomous driving controller configured to control the autonomous driving of the autonomous driving vehicle based on the information about or associated with the driving pattern of the driver.

In various exemplary embodiments of the present disclosure, the autonomous driving controller may be configured to use information related to autonomous driving controlled based on the driving pattern information stored in the autonomous driving vehicle as evidence for accident avoidance when the autonomous driving vehicle has an accident with another vehicle, pedestrian, objects or buildings.

In some exemplary embodiments of the present disclosure, the autonomous driving controller may be configured to extract the driving pattern information obtained based on or through the tutorial when surrounding situations are sensed by or recognized through the autonomous driving vehicle and to control the autonomous driving vehicle based on the extracted driving pattern information.

In certain exemplary embodiments of the present disclosure, the tutorial execution unit may be configured to generate a virtual situation by producing at least one scenario for extracting or recognizing the driving pattern of the driver or storing the information about or associated with the driving pattern of the driver and to reproduce the generated virtual situation.

In some exemplary embodiments of the present disclosure, the tutorial execution unit may be configured to provide question (and/or answer) information for extracting or recognizing the driving pattern of the driver or storing the information about the driving pattern of the driver as the tutorial and to receive an answer related to the question (and/or answer) information from the driver.

In various exemplary embodiments of the present disclosure, the tutorial execution unit may be configured to provide a driving situation in which the autonomous driving vehicle is driven on a road in real time as the tutorial.

In certain exemplary embodiments of the present disclosure, the tutorial execution unit may be configured to execute the tutorial when authentication on the driver is performed based on identification information of the driver.

DETAILED DESCRIPTION

Hereinafter, embodiments are described in detail with reference to the accompanying drawings.

Figure 1:
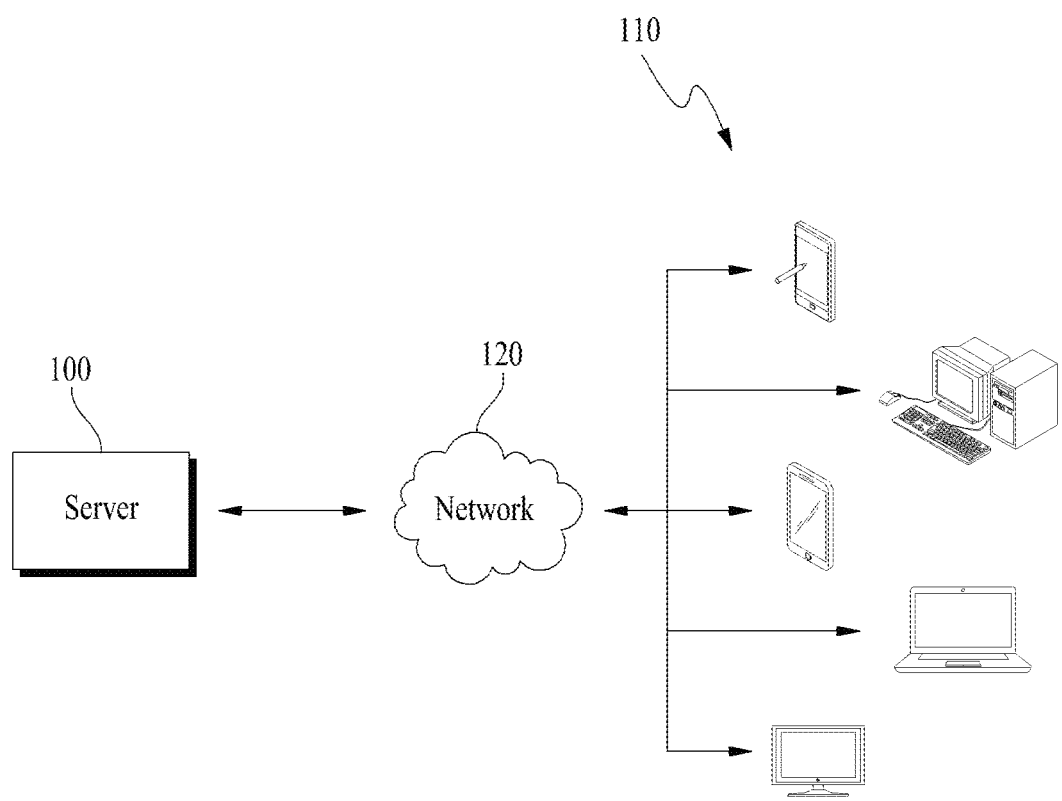
FIG. 1 shows a diagram of a network environment according to an exemplary embodiment of the present disclosure.

FIG. 1 shows a diagram of a network environment according to an exemplary embodiment of the present disclosure.

In the exemplary embodiment of the present disclosure, the network environment of FIG. 1 may include one or more of a terminal 110, a server 100 and a network 120. FIG. 1 shows one of examples of the network environment for illustration purposes, and the number of terminals or the number of servers is not limited as in FIG. 1.

The terminal 110 may be a fixed type terminal or a mobile type terminal implemented as a computer device. The terminal 110 may include, for example, but not limited to, a smartphone, a mobile phone, a navigator, a computer, a laptop, a terminal for digital broadcasting, a personal digital assistants (PDA), a portable multimedia player (PMP), a tablet personal computer (PC), a wearable device, a head mounted display (HMD), and an autonomous driving vehicle. The terminal 110 may communicate with other terminals and/or the server 100 over the network 120 or directly using a wireless or wired communication method.

A communication method may include, for instance, but not limited to, short-distance wireless communication between devices and communication methods using communication networks (e.g., a mobile communication network, wired Internet, wireless Internet and a broadcast network) which may be included in the network 120. For example, the network 120 may include one or more of a personal area network (PAN), a local area network (LAN), a campus area network (CAN), a metropolitan area network (MAN), a wide area network (WAN), a broadband network (BBN) and the Internet. Furthermore, the network 120 may include, for example, but not limited to, one or more of network topologies, including a bus network, a start network, a ring network, a mesh network, a star-bus network, and a tree or hierarchical network.

The server 100 may be implemented as a computer device or a plurality of computer devices that can provide instructions, code, a file, content and services through communication with the terminal(s) 110 over the network 120. For example, the server 100 may provide a file for the installation of an application to the terminal 110 accessed thereto over the network 120. In this case, the terminal 110 may install the application using the file provided by the server 100. Furthermore, the terminal 110 may access the server 100 under the control of an operating system (OS) or at least one program (e.g., a browser or the installed application) included in the terminal 110, and may receive services or content provided by the server 100. For example, when the terminal 110 transmits a service request message to the server 100 over the network 120 under the control of the application, the server 100 may transmit code, corresponding to the service request message, to the terminal 110. The terminal 110 may provide content to a user by configuring and displaying a screen according to the code under the control of the application.

Figure 2:
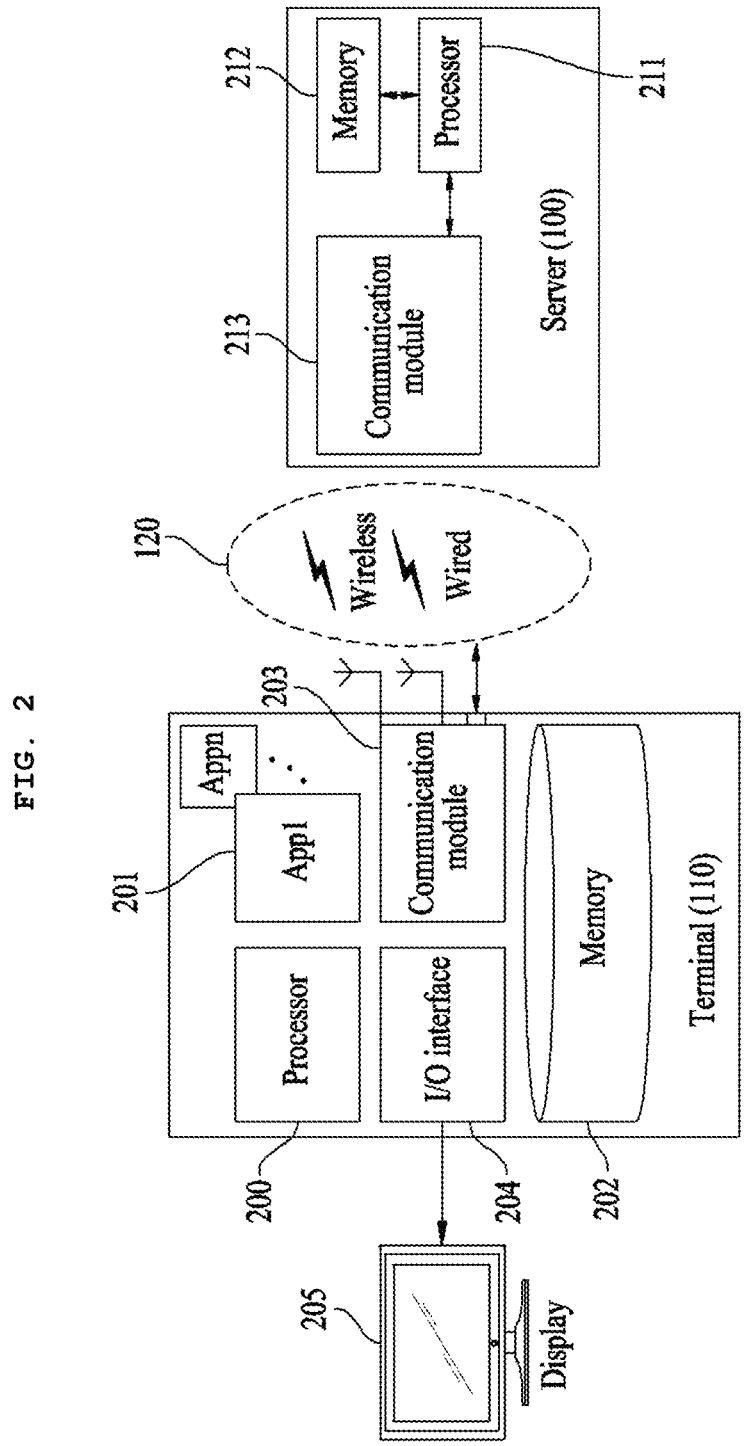
FIG. 2 shows a block diagram of an example of a network environment illustrating internal configurations of a terminal and a server according to an exemplary embodiment of the present disclosure.

FIG. 2 shows a block diagram of an example of a network environment illustrating internal configurations of a terminal and a server according to an exemplary embodiment of the present disclosure.

FIG. 2 illustrates the internal configurations of one terminal and one server, but the same or similar elements may be applied to other terminals or other servers which may be included in the network environment of FIG. 1.

The terminal 110 may include one or more of a processor 200, at least one application (App) 201, memory 202, a communication module 203 and an input and output (I/O) interface 204.

The server 100 may include a processor 211, memory 212 and a communication module 213. The memory 202, 212 may be a transitory or non-transitory computer-readable recording medium, and may include, for example, but not limited to, random access memory (RAM), read only memory (ROM) and a permanent mass storage device, such as a hard drive. Furthermore, the OS and/or at least one program code (e.g., code for a browser installed and driven on the terminal 110 or the aforementioned application) may be stored in the memory 202, 212. Such software elements may be loaded from a computer-readable recording medium separate from the memory 202, 212. For example, the separate computer-readable recording medium may include computer-readable recording media, such as a floppy drive, a disk, a tape, a DVD/CD-ROM drive and a memory card. In another embodiment, the software elements may be loaded on the memory 202, 212 through the communication module 203, 213 not a computer-readable recording medium. For example, at least one program may be loaded on the memory 202, 212 using a program (e.g., the aforementioned application) installed by files that are provided by developers or a file distribution system (e.g., the aforementioned server 100) that distributes the installation file of an application over the network 120.

The processor 200, 211 may be configured to process an instruction of a computer program by executing basic arithmetic, logic, and I/O operation. The instruction may be provided to the processor 200, 211 by the memory 202, 212 or the communication module 203, 213. For example, the processor 200, 211 may be configured to execute the instruction received according to a program code stored in a recording or storing device, such as the memory 202, 212.

The communication module 203, 213 may provide a function for communication between the terminal 110 and the server 100 over the network 120, and may provide a function for communicating with another terminal or another server. For example, a request generated by the processor 200 of the terminal 110 according to a program code stored in a recording device, such as the memory 202, may be transmitted to the server 100 over the network 120 under the control of, or by the request of, the communication module 203. Inversely, a control signal, an instruction, content, a file or any data provided under the control of the processor 211 of the server 100 may be received by the terminal 110 through the communication module 203 of the terminal 110 via the communication module 213 and the network 120. For example, a control signal or instruction of the server 100 received through the communication module 203 may be transmitted to the processor 200 or the memory 202, and the content or file may be stored in a storage medium that may be further included in the terminal 110.

The I/O interface 204 may be, for example, means for an interface with an I/O device. For example, the input device of the I/O device may include a device, such as a keyboard or a mouse. Furthermore, the output device of the I/O device may include a device, such as a display for displaying a communication session of an application. For another example, the I/O interface 204 may be means for an interface with a device in which functions for input and output have been integrated into one device, such as a touch screen. For more detailed example, the processor 200 of the terminal 110 may display a service screen or content, configured using data provided by the server 100 or another terminal, on the display 205 through the I/O interface 204 in processing an instruction of a computer program loaded on the memory 202.

Furthermore, in other embodiments, the terminal 110 and the server 100 may include greater or lesser elements than the elements of FIG. 2. However, it is not necessary to clearly show most of conventional elements. For example, the terminal 110 may be implemented to include an I/O device or may further include other elements, such as a transceiver, a global positioning system (GPS) module, a camera, various sensors, and a database. For more detailed example, if the terminal 110 is a smartphone, various elements, such as an acceleration sensor, a gyro sensor, a camera module, various physical buttons, buttons using a touch panel, I/O ports, and a vibrator for vibration commonly included in the smartphone, may be further included in the terminal 110.

Figure 3:
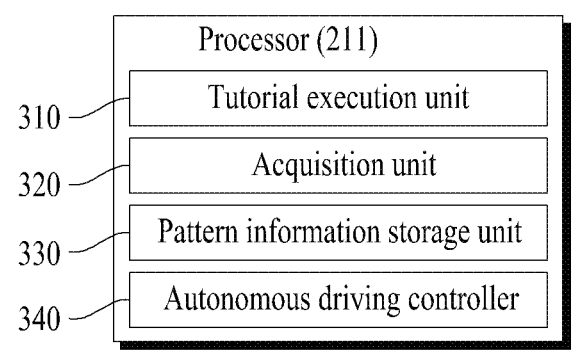
FIG. 3 shows a block diagram of an apparatus for controlling an autonomous driving vehicle according to an exemplary embodiment of the present disclosure.
Figure 4:
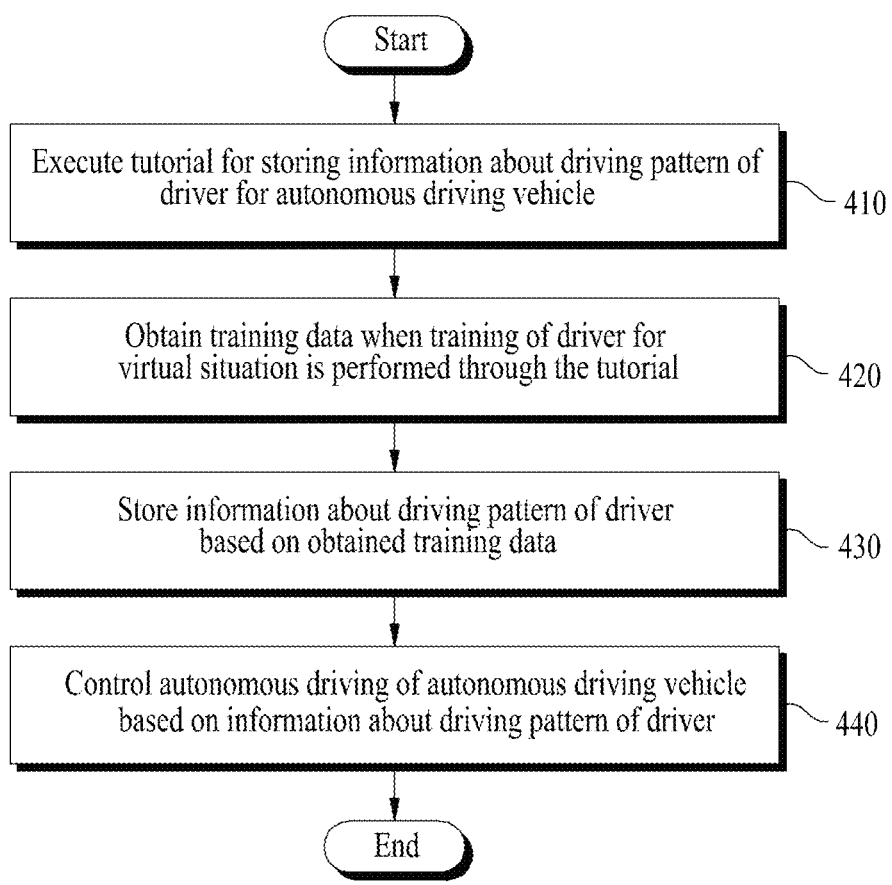
FIG. 4 shows a flowchart of a method of controlling an autonomous driving vehicle according to an exemplary embodiment of the present disclosure.

FIG. 3 shows a block diagram of an apparatus for controlling an autonomous driving vehicle according to an exemplary embodiment of the present disclosure. The apparatus for controlling the autonomous driving vehicle may be included in the server, although it is not required. FIG. 4 shows a flowchart of a method for controlling an autonomous driving vehicle according to an exemplary embodiment of the present disclosure.

The processor 211 and/or the memory 212 of the server 100 may include one or more of a tutorial execution unit 310, an acquisition unit 320, a pattern information storage unit 330 and an autonomous driving controller 340. A "unit" or "controller" may refer to a hardware based unit, software based unit or a combination of hardware and software. Embodiments of hardware based units may include self-contained components such as chipsets, specialized circuitry and one or more memory devices, while a software-based module may be part of a program code or linked to the program code containing specific programed instructions, which may be loaded in the memory 212. A module (whether hardware, software, or a combination thereof) may be designed to implement or execute one or more particular functions or routines. For example, one or more elements included in the processor 211 may be expressions or codes of different functions or algorithms performed by the processor 211 according to a control instruction provided by a program code stored in the server 100. The processor 211 or at least one of the elements of the processor 211 may control the server 100 so that the server 100 can perform one or more of the steps 41d0 to 440 of the accident avoidance method of FIG. 4. In this case, the processor 211 or at least one of the elements of the processor 211 may be implemented to execute instructions according to a code of an operating system stored in the memory 212 and a code of at least one program.

The processor 211 may load a program code, stored in a file of a program for an accident avoidance method, for example, the method illustrated in FIG. 4, on the memory 212. For example, when a program is executed in the server 100, the processor 211 may control the server 100 so that the server 100 can load a program code from a file of a program to the memory 212 under the control of an operating system. In an example, one or more of the tutorial execution unit 310, acquisition unit 320, pattern information storage unit 330 and autonomous driving controller 340 of the processor 211 may be different functional expressions of the processor 211 for subsequently executing the steps 410 to 440 of FIG. 4 by executing the instruction of a corresponding part of the program code loaded on the memory 212.

In step 410, the tutorial execution unit 310 may be configured to execute a tutorial. For example, the tutorial may be a software program or algorithm configured to provide a virtual simulation, a driving situation and/or a questionnaire for extracting or recognizing a driving pattern of a driver.

In one exemplary embodiment, the tutorial execution unit 310 may execute the tutorial to generate and/or provide a virtual situation by producing at least one scenario for storing information about or associated with the driving pattern of a driver, and may reproduce the generated virtual situation. For instance, a scenario produced by a supplier (e.g., scenario producer) may be input to the processor 211 and/or memory 212, or a scenario including each condition may be automatically generated as at least one condition is set. For example, the tutorial execution unit 310 may execute the tutorial for reproducing a virtual situation based on augmented reality or virtual reality through an output device, for example, but not limited to, a display which may be installed on an autonomous driving vehicle or operate in conjunction with the autonomous driving vehicle. The tutorial execution unit 310 may execute the tutorial when the autonomous driving vehicle is determined to be a non-driving state. The tutorial execution unit 310 may execute the tutorial after authentication on a driver is performed based on identification information of the driver.

In another exemplary embodiment, the tutorial execution unit 310 may be configured to provide question and/or answer information for storing information about or associated with the driving pattern of a driver as a tutorial, and may receive at least one answer related to the question and/or answer information from the driver. Furthermore, the tutorial execution unit 310 may provide a driving situation in which the autonomous driving vehicle is being driven on a road in real time as a tutorial.

In step 420, the acquisition unit 320 may obtain training data as or while the tutorial performs the training of the driver. For example, the acquisition unit 320 may obtain the training data as or while the tutorial execution unit 310 provides a virtual situation and/or performs the training of the driver through the tutorial. Alternatively, the acquisition unit 320 may obtain the training data based on, for example, but not limited to, answers related to questions or may obtain information related to or associated with the driving situation in which the autonomous driving vehicle is driven on a road in real time as the training data.

In step 430, the pattern information storage unit 330 may be configured to generate and/or store information about or associated with the driving pattern of the driver based on the obtained training data. The pattern information storage unit 330 may estimate reference data for each of the training data as scenarios for the virtual situation are collected, and may store the information about the driving pattern of the driver based on the estimated reference data.

In step 440, the autonomous driving controller 340 may be configured to control the autonomous driving vehicle according to the stored information associated with the driving pattern of the driver. For example, the autonomous driving controller 340 may control the autonomous driving of the autonomous driving vehicle based on the information about or associated with the driving pattern of the driver. When the autonomous driving vehicle has an accident with another vehicle, the autonomous driving controller 340 may use information, related to autonomous driving controlled based on the driving pattern information stored in the autonomous driving vehicle, as evidence for accident avoidance. The autonomous driving controller 340 may start autonomous driving based on driving pattern information obtained from the driver by the training through the tutorial which is performed by the driver. The autonomous driving controller 340 may sense whether the driver drives the autonomous driving vehicle. The autonomous driving controller 340 may sense or recognize surrounding situations of the autonomous driving vehicle and extract driving pattern information obtained based on the surrounding situations, and may control the autonomous driving vehicle based on the extracted driving pattern information. Furthermore, the driver may recognize surrounding situations and the autonomous driving controller 340 may control the autonomous driving vehicle based on control data received based on the manual driving of a driver. For example, the autonomous driving controller 340 may calculate collision prediction information between the autonomous driving vehicle and a vehicle being driven around, ahead of or behind the autonomous driving vehicle, and may control the autonomous driving based on the information about or associated with the driving pattern of the driver while maintaining the speed in order to maintain a specific distance from the vehicle being driven near, ahead of or behind the autonomous driving vehicle based on the calculated collision prediction information.

Figure 5:
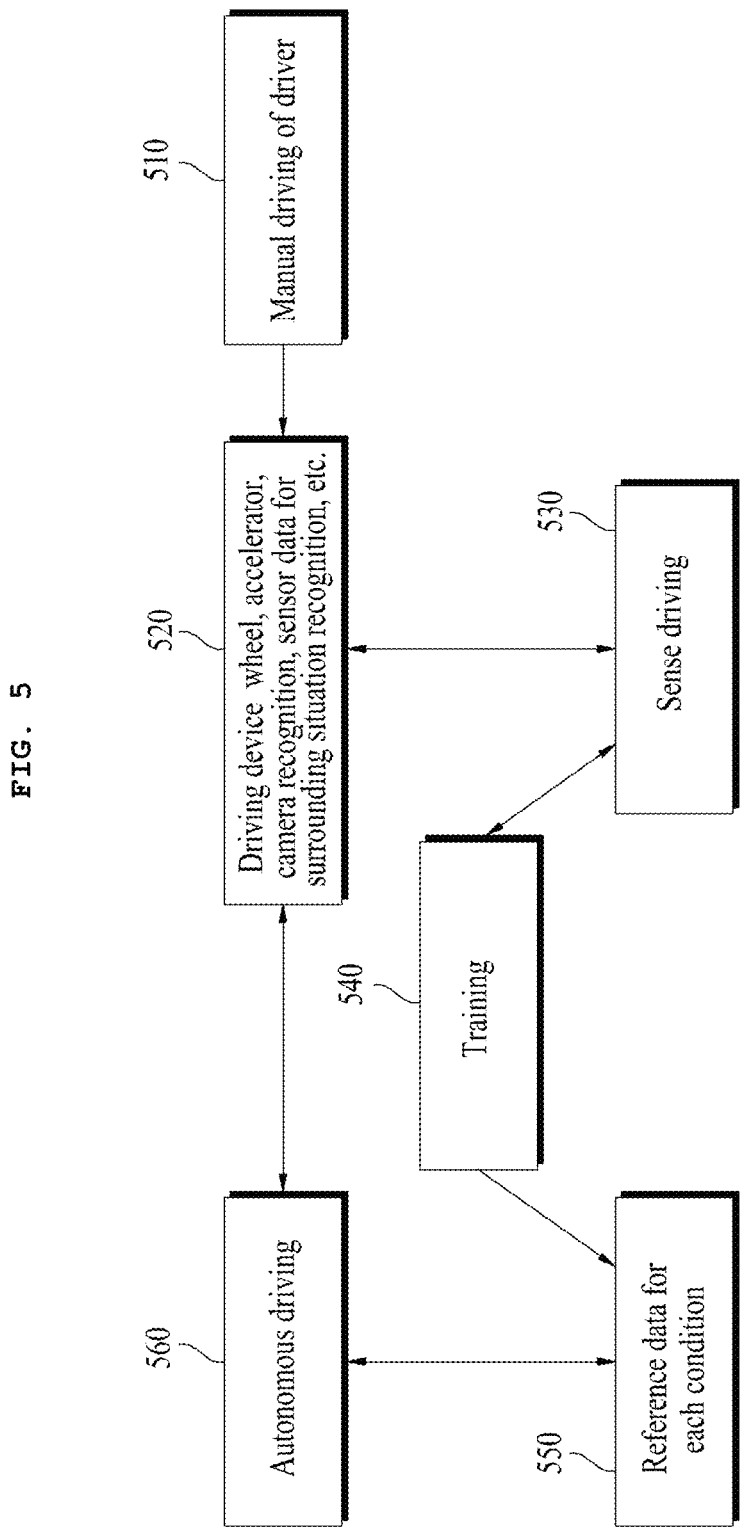
FIG. 5 is a diagram for illustrating a process for controlling autonomous driving of an autonomous driving vehicle according to an exemplary embodiment of the present disclosure.

FIG. 5 is a diagram for illustrating a process for controlling autonomous driving of an autonomous driving vehicle according to an exemplary embodiment of the present disclosure.

Figure 6:
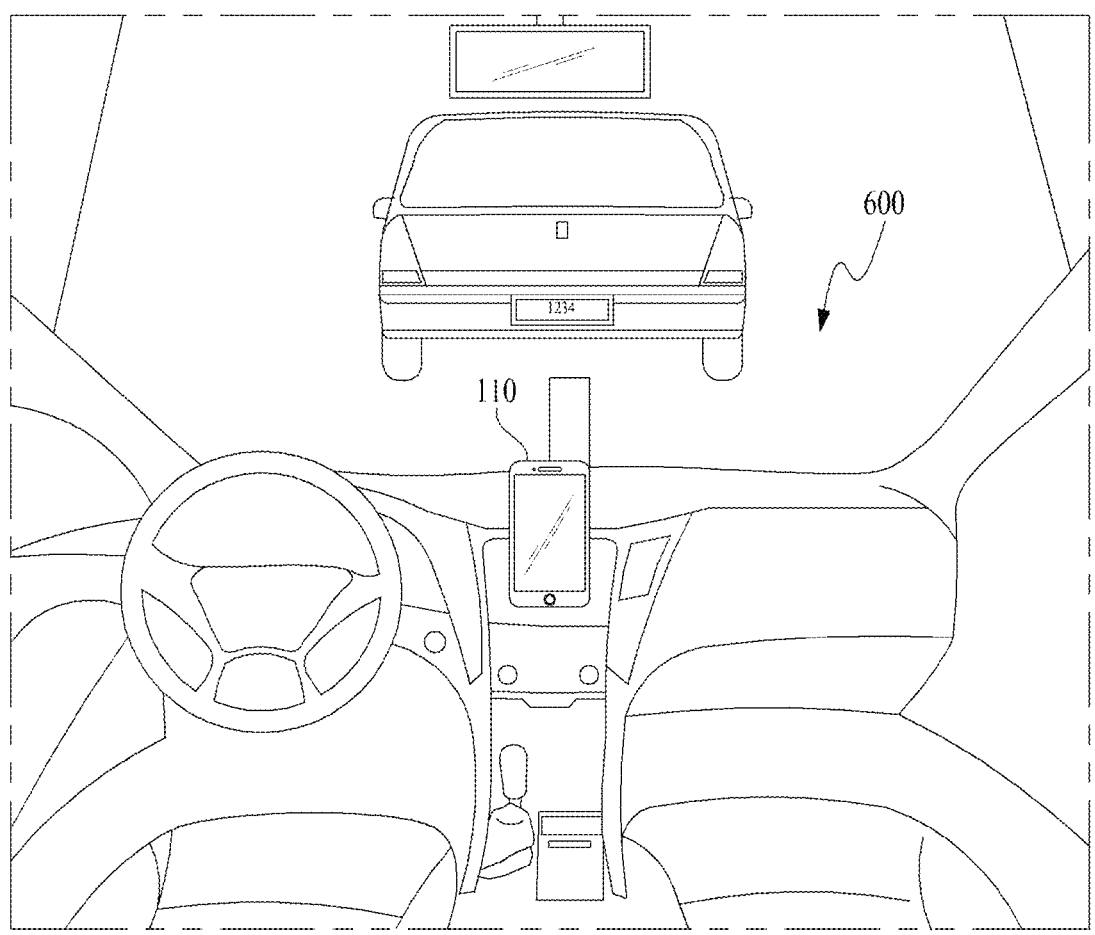
FIGS. 6 and 7 show examples of an autonomous driving vehicle according to an exemplary embodiment of the present disclosure.
Figure 7:
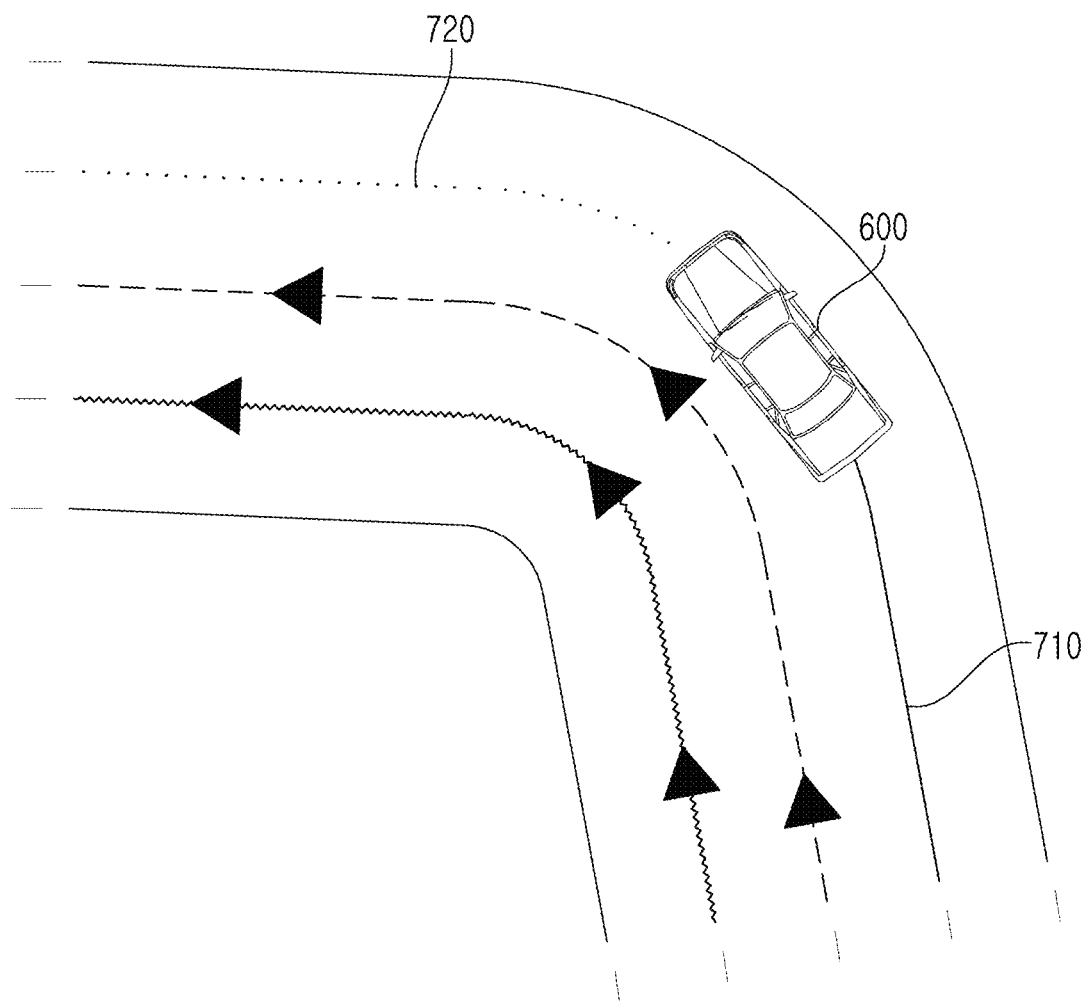

For a description of the process for the server to control the autonomous driving of an autonomous driving vehicle, reference is made to an autonomous driving vehicle shown in FIGS. 6 and 7. The autonomous driving vehicle 600 of FIG. 6 may mean, for example, but not limited to, a vehicle that can autonomously drive without a driver's direct manipulation of the vehicle. For example, the autonomous driving vehicle 600 may recognize a road situation and automatically drive although a driver does not control a brake, a wheel and an accelerator.

The server may sense or determine whether a driving device included in the autonomous driving vehicle 600 is controlled (Operation 520). For example, the server may sense or determine that the driving device is controlled through at least one sensor for recognizing a wheel, an accelerator, a camera, and surrounding situations.

The server may determine whether the driving device of the autonomous driving vehicle 600 is controlled by the manual driving of a driver (Operation 510). For example, the autonomous driving vehicle 600 may be driven based on control data input by the driver. In this case, the server may perform driving by excluding control data, input from the driver, not included in a preset criterion.

When the control of the driving device of the autonomous driving vehicle 600 is recognized, the server may sense the driving of the autonomous driving vehicle 600 by the driver (Operation 530). The server may perform training (Operation 540) when the driving of the autonomous driving vehicle by the driver is sensed. For example, the server may execute a tutorial in order to obtain the training data of the driver. The server may provide question and/or answer information (e.g. questionnaire) for gathering and/or storing information about the driving pattern of the driver as the tutorial, and may provide a driving situation in which an autonomous driving vehicle is driven on a road in real time as the tutorial.

For example, the server may generate and provide a virtual situation to the driver by producing at least one scenario. The server may provide different backgrounds for one virtual situation which is executed based on the same scenario so that the driver can experience various tutorials in order to induce the driver's interest.

The server may execute the tutorial for reproducing the virtual situation when the autonomous driving vehicle is a non-driving state, for example, a stop state. The tutorial may reproduce the virtual situation based on augmented reality or virtual reality through a display installed on the autonomous driving vehicle and/or associated with the autonomous driving vehicle. For example, a separate display may be installed on the autonomous driving vehicle, and a display function may be executed in a window of the autonomous driving vehicle. Alternatively, the tutorial may be executed, output or displayed through the display of the terminal 110 associated with the autonomous driving vehicle. As described above, the driver can drive in the executed tutorial more realistically because the tutorial reproduces the virtual situation based on augmented reality or virtual reality. The server may obtain training data when the driving device of the autonomous driving vehicle is directly manipulated by a driver. In this case, the tutorial may provide one or more preset steps that the driver needs to perform, and autonomous driving may be started only when the driver completes those steps.

For another example, the server may receive one or more answers from a driver in response to question (and/or answer) information, provided to the driver, as the question and answer information for storing information about the driving pattern of the driver is provided as a tutorial. More specifically, the server may provide to the driver the question and answer information as a tutorial through, for example, but not limited to, a display separately installed on the autonomous driving vehicle, a display in a window of the autonomous driving vehicle, or the display of the terminal associated with the autonomous driving vehicle. The driver enters or transmits one or more answers responding to or related to the question and answer information by selecting or inputting one or more responses to one or more questions provided in the question and answer information. The server may obtain the answers related to information as training data or may generate training data based on the answers of the driver. In this case, information related to questions and answers, such as a questionnaire, may be provided to the driver when the autonomous driving vehicle is in the stop or non-stop state. Furthermore, if the autonomous driving vehicle provides the question and answer information as a tutorial in the non-stop state, the server may provide the question and answer information through a voice message, and the answers corresponding or related to the question and answer information may be input through voice data from the driver.

For yet another example, the server may use or provide a driving situation in which an autonomous driving vehicle is driven manually by the driver on a road in real time as a tutorial. The server may obtain control data, generated based on the driving operation of the driver while the driver drives the autonomous driving vehicle, as training data. For example, a driving device may be manipulated by the driver while the autonomous driving vehicle is driven. The server may obtain the control data, recognized as the driving device is manipulated by the driver, as the training data.

The server may generate information about or associated with the driving pattern of a driver based on the training data of each driver by providing the tutorial. The server may generate the information about or associated with the driving pattern of the driver based on the training data of the driver obtained as the tutorial including the same virtual situation is executed more than a preset number. For example, the server may sense that the driver rotates or moves the wheel of the autonomous driving vehicle at a preset angle (e.g., 70 degrees) or more in a situation in which another vehicle being driven in a left or right lane ahead of the autonomous driving vehicle cuts in front of the autonomous driving vehicle. The server may store such an action of the driver as training data. The server may store the repetition of the same or similar action of the driver as information about the pattern of the driver as the driver continues to repeat the same or similar action through the tutorial. Furthermore, when the tutorial senses a prohibition action of the driver, the server may notify the driver of a danger in real time so that the driver does not take such a prohibition action. For example, the server may notify the driver of a danger when a driver's action to turn while stepping on the brake, that is, a previously set prohibition behavior, is sensed. The server may not store training data related to such an action. Accordingly, when an accident occurs during the autonomous driving of the autonomous driving vehicle based on information about the driving pattern of the driver obtained through the tutorial, the server can clarify where the responsibility for damage lies.

When the driving device of the autonomous driving vehicle is controlled by the manual driving of the driver of the autonomous driving vehicle 600 (Operation 510), the autonomous driving vehicle may be driven according to the manual driving of the driver. Alternatively, the server may extract reference data for each condition from information about the driving pattern of the driver generated based on training data trained for the driver, and may perform autonomous driving based on the extracted reference data (Operation 550). Specifically, the server may recognize surrounding situations of the autonomous driving vehicle through the autonomous driving vehicle. For example, the server may determine a traffic situation around the autonomous driving vehicle 600, and may determine information about or related to a road where the autonomous driving vehicle is currently located and the number of vehicles nearby. The server may extract information about the driving pattern of the driver corresponding to the surrounding situations recognized through the autonomous driving vehicle. For example, although the same virtual situation as a surrounding situation recognized through the autonomous driving vehicle is not present, the server may estimate reference data for each of training data by collecting similar virtual situations included in the tutorial, and may extract information about the driving pattern of the driver based on the estimated reference data. The server may estimate how the conclusion of conditions for the acts of the driver has been derived through the training data. The server may control the autonomous driving based on the extracted information about the driving pattern of the driver based on the estimated reference data.

FIG. 7 is an example for illustrating that autonomous driving is controlled in an autonomous driving vehicle 600. The server may extract driving pattern information obtained based on a tutorial as the autonomous driving vehicle recognizes surrounding situations, and may control the autonomous driving vehicle based on the extracted driving pattern information. The autonomous driving vehicle 600 may drive a certain or specific distance like 710 while maintaining a preset distance from a vehicle being driven on a specific road as it senses a vehicle being driving around the autonomous driving vehicle 600, and then may drive like 720. For example, the autonomous driving vehicle 600 may drive straight a certain or specific distance at 50 Km/h based on information about the training pattern of a driver in a road including a corner, may turn to the left of the corner 45 degrees, and may then drive straight at 20 Km/h. Furthermore, the server may calculate collision prediction information between the autonomous driving vehicle and at least one other vehicle driving around, ahead of or behind the autonomous driving vehicle, and may control the speed and/or direction in order to maintain a specific distance from the other vehicle(s) based on the calculated collision prediction information.

Figure 8:
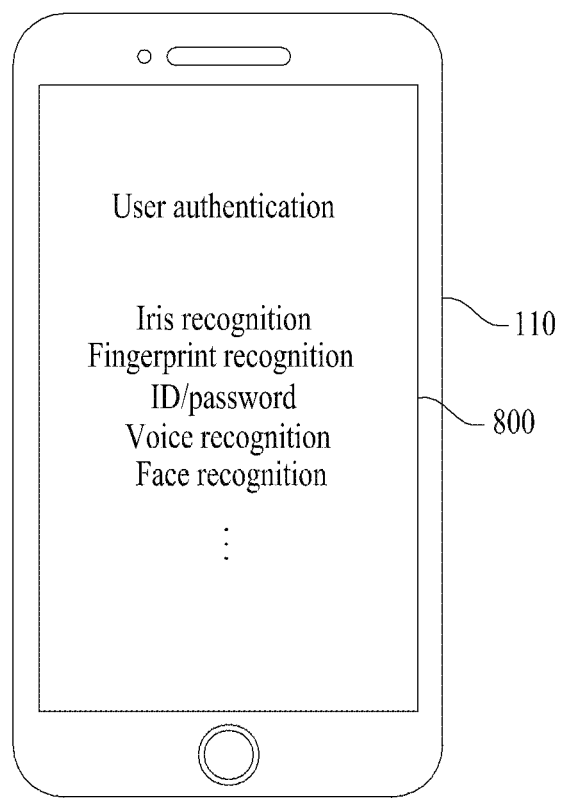
FIG. 8 shows an example of a user interface for perform authentication on a driver according to an exemplary embodiment of the present disclosure.

FIG. 8 shows an example of a user interface for performing authentication on a driver according to an exemplary embodiment of the present disclosure.

The server may store information about the driving pattern of a driver through a tutorial performed in an autonomous driving vehicle, and may perform a user authentication process in order to control autonomous driving based on the stored information about the driving pattern of the corresponding driver. For example, the server may execute the authentication process in order to pattern training data obtained through the tutorial. In this case, as the autonomous driving vehicle or server performs the authentication process for the driver, the autonomous driving vehicle or server may obtain the information about the driving pattern of the driver even in the case when the driver has performed the tutorial in a different vehicle other than the autonomous driving vehicle of the driver.

The autonomous driving vehicle may perform autonomous driving without a driver. Furthermore, when a driver is present in the autonomous driving vehicle, the autonomous driving vehicle may have a driver mode in which the autonomous driving vehicle is manually controlled by the driver or an autonomous driving mode in which the autonomous driving vehicle is controlled or driven based on information about the driving pattern of the driver. The autonomous driving vehicle may identify the driver through the authentication process regardless of whether the driver is present in the autonomous driving vehicle. An authentication method or process may include various methods capable of identifying a driver, such as iris recognition, fingerprint recognition, ID/password recognition, voice recognition, and face recognition. When the driver rides on the autonomous driving vehicle, the authentication process may be executed through the display of the autonomous driving vehicle or a terminal associated with the autonomous driving vehicle. For example, when the driver takes the wheel of the autonomous driving vehicle, the authentication process may be performed. Furthermore, if the driver is not present in the autonomous driving vehicle, the authentication process may be executed through a terminal associated with the autonomous driving vehicle, for example, but not limited to, a device which is communicatively connected to the autonomous driving vehicle. The server may compare authentication information provided or authenticated from the driver with authentication information previously stored therein. If the authentication information provided or authenticated from the driver matches the previously stored authentication information, the server does not execute the autonomous driving mode for the driver. If the authentication information provided or authenticated from the driver matches the previously stored authentication information, the server performs the autonomous driving mode. When the authentication is performed on the driver, the server may extract driving pattern information associated with or related to the driver who has been authenticated to the autonomous driving vehicle, and may start the autonomous driving.

Figure 9:
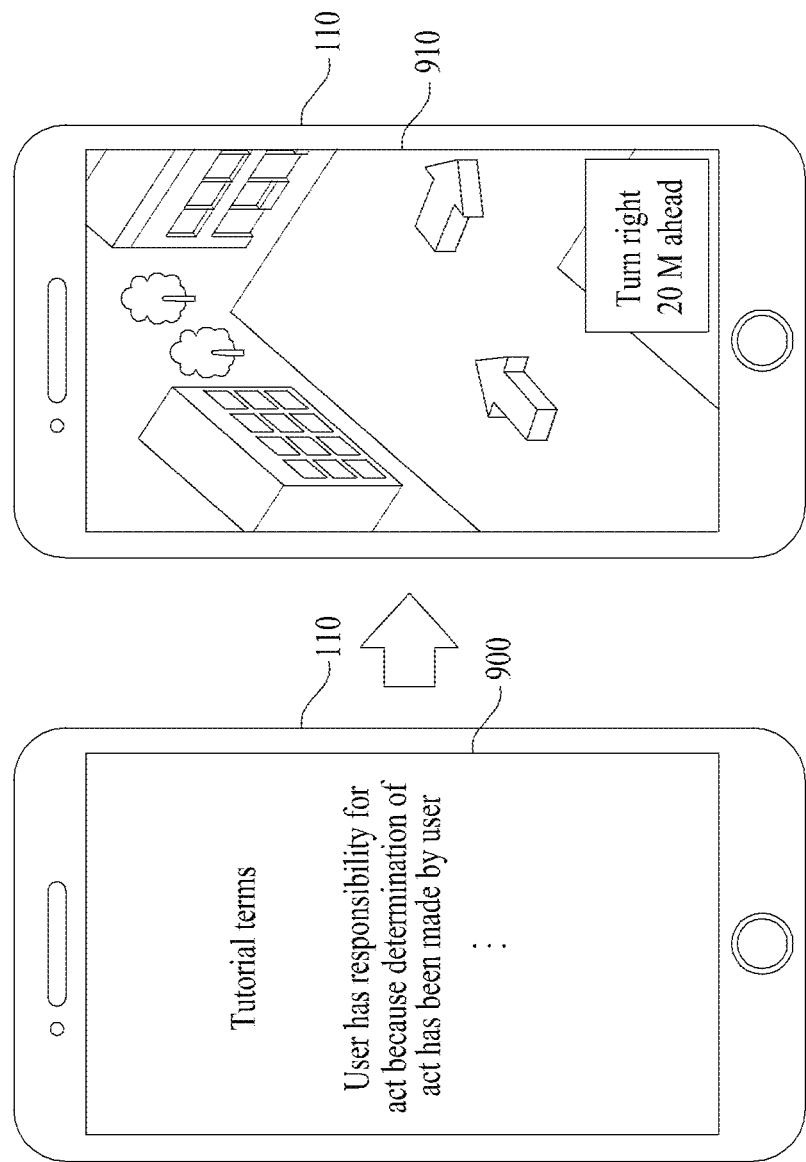
FIG. 9 shows user interfaces of a tutorial according to an exemplary embodiment of the present disclosure.

FIG. 9 illustrates user interfaces of a tutorial according to an exemplary embodiment of the present disclosure.

The server may execute a tutorial in order to obtain information about the driving pattern of a driver. The tutorial may be provided in various forms. For example, the tutorial may reproduce a virtual situation, question and answer information may be provided as the tutorial, or a driving situation in which the driver manually drives an autonomous driving vehicle on a road in real time may be provided as the tutorial.

FIG. 9 illustrates an example in which a tutorial for reproducing a virtual situation is executed. In this example, when the autonomous driving vehicle 600 is determined to be in a non-driving state or stop state, the server may execute the tutorial. For example, when the autonomous driving vehicle 600 is determined to be in a parking state, the server may identify that the autonomous driving vehicle 600 is in a stop state. Alternatively, when the speed of the autonomous driving vehicle 600 is determined to be 0 or less than a predetermined value, the server may identify that the autonomous driving vehicle is in the stop state. In addition, the server may identify or determine the non-driving state of the autonomous driving vehicle 600 by sensing or recognizing the wheel, accelerator, camera, and surrounding situations of the autonomous driving vehicle 600.

The server may execute the tutorial and output information or interface through an output device, such as the display of the autonomous driving vehicle 600, a separate display installed on the autonomous driving vehicle 600, or the display of the terminal 110 associated with the autonomous driving vehicle 600. FIG. 9 illustrates an exemplary embodiment of the terminal 110, associated with the autonomous driving vehicle, executing the tutorial. In the terminal 110 associated with the autonomous driving vehicle 600, the tutorial may be executed within the autonomous driving vehicle 600.

For example, when the autonomous driving vehicle 600 is determined to be the non-driving state, the server may display a tutorial terms screen 900 on the display of the terminal 110. After the server transmits the tutorial terms to the terminal 110, a tutorial screen 910 may be displayed on the display of the terminal 110. For instance, the tutorial output to the tutorial screen 910 reproduces a virtual situation implemented, for example, but not limited to, augmented reality or virtual reality. The driver may directly manipulate or drive the driving device of the autonomous driving vehicle 600 through the tutorial. Since the tutorial is executed in the autonomous driving vehicle, driving devices, for example, a wheel, brake, accelerator, and a plurality of sensors of the autonomous driving vehicle may be controlled by the driver. The server may obtain training data from the driving device manipulated by the driver.

Figure 10:
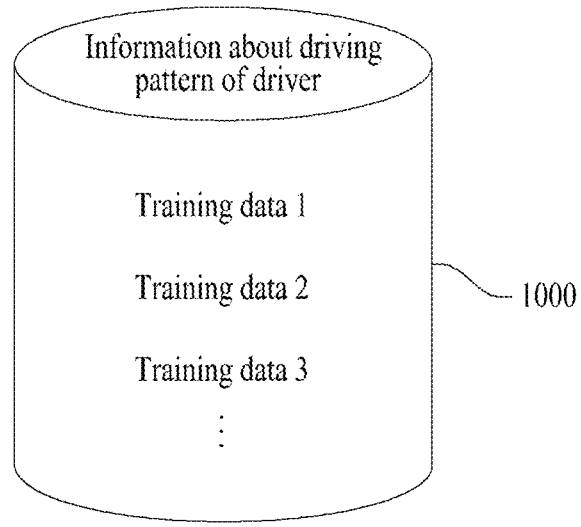
FIG. 10 is a conceptual diagram of pattern information according to an exemplary embodiment of the present disclosure.

FIG. 10 is a conceptual diagram of pattern information according to an exemplary embodiment of the present disclosure. For example, the pattern information may be generated and stored based on training data obtained when the server executes a tutorial.

When a driver responds to question and answer information provided as a tutorial, for example, by selecting or inputting at least one response or answers in response to the question and answer information, the server may generate and/or obtain the training data of the driver and generate and/or store information about the driving pattern of the driver based on the obtained training data. Alternatively, as a driving situation in which an autonomous driving vehicle is driven on a road in real time, for example, but not limited to a situation that the driver manually drives the autonomous driving vehicle by oneself, is provided as a tutorial, the server may obtain control data, received from the autonomous driving vehicle while the driver is driving, as training data. The server may obtain the control data, recognized when a driving device is manipulated by the driver, as training data.

Alternatively, the server may obtain the training data when the training of the driver in a virtual situation is performed through the tutorial. The server may generate and/or store information about the driving pattern of the driver based on the obtained training data. In this case, the server may store the pattern information 1000 of the driver in a database. When the training data of the driver is updated, the server may update the pattern information 1000 of the driver and store the updated pattern information 1000 of the driver.

The server may generate information about the driving pattern of the driver based on the training data stored in the database. The server may estimate and/or generate reference data corresponding to a specific situation based on each of the training data by collecting scenarios for the virtual situation. The server might previously obtain the training data of the driver for a specific situation, for example, but not limited to, a situation in which the driver turned the wheel to the left in some situation and a situation in which the driver stepped on the brake in other situation. The server may generate information about the driving pattern of the driver based on the training data obtained from the driver. For example, the server may extract information about the driving pattern of the driver corresponding to each of surrounding situations when the autonomous driving is performed in the autonomous driving vehicle. The server may extract information about the driving pattern of the driver corresponding to surrounding situations of the autonomous driving vehicle, for example, but not limited to, a traffic situation, the speed and driving direction of each vehicle, and road information. The server may extract information about the pattern of the driver corresponding to a surrounding situation of the autonomous driving vehicle, such as a driving pattern of the driver having the same or similar situation as or to a current surrounding situation of the autonomous driving vehicle, and may control the autonomous driving based on the extracted information about or associated with the extracted driving pattern of the driver. Furthermore, the server may perform the autonomous driving by combining reference data.

When the training data obtained from the driver corresponds to a prohibition situation prohibited in the autonomous driving vehicle, the server may notify the driver of a danger of the prohibition situation, and may exclude the training data corresponding to the prohibition situation and may not store it as the training data therein.

Figure 11:
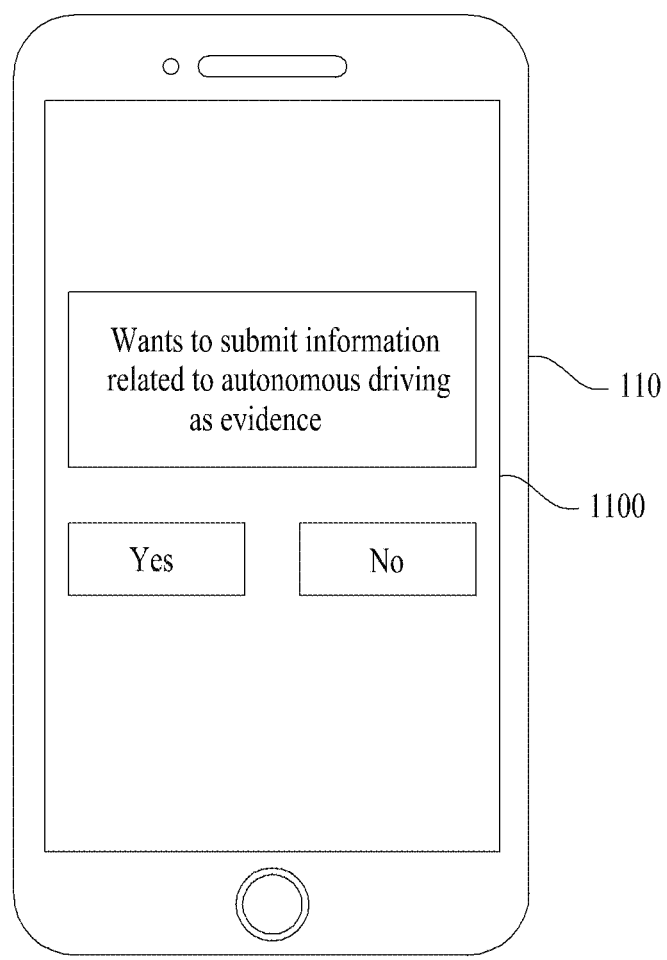
FIG. 11 shows a user interface for submitting information related to an accident occurred in an autonomous driving vehicle as evidence data according to an exemplary embodiment of the present disclosure.

FIG. 11 shows a user interface for submitting information related to an accident occurred in an autonomous driving vehicle as evidence data according to an exemplary embodiment of the present disclosure.

The server may recognize that the accident occurs related to the autonomous driving vehicle. For example, a collision such as a rear-end collision may occur to the autonomous driving vehicle. The server may store information related to autonomous driving control which controls the autonomous driving vehicle based on driving pattern information stored in the autonomous driving vehicle or server. For instance, the server may store video information related to the accident occurred to the autonomous driving vehicle, driving speed when the accident occurred, a driving direction when the accident occurred, and a moving or driving path until the accident occurred.

The server may use information related to autonomous driving control, controlling the autonomous driving vehicle based on the driving pattern information stored in the autonomous driving vehicle or server, as evidence for accident avoidance. In this case, the server may submit the information related to the autonomous driving control to a third party, for example, but not limited to, an insurance company, a police station, a court and any organization or entity which handles the accident. The driver may submit the information related to the autonomous driving control through the terminal 110 online or offline. For example, the terminal 110 may display an accident avoidance screen or interface 1100. The accident avoidance screen or interface 1100 may include a message querying whether the driver wants to submit the information related to the autonomous driving control as shown in FIG. 11. If the driver wants to submit the information related to the autonomous driving control, the information related to the autonomous driving control may be transmitted when the driver selects a positive response in the message of the user interface 1100.

For example, if the autonomous driving vehicle has caused an accident or subjected to the accident, the information, related to the autonomous driving control controlling based on the information about the driving pattern of the driver, can be used as evidence to clarify or prove the responsibility of the accident. Furthermore, the information related to the autonomous driving control controlling based on the information about the driving pattern of the driver can be used as evidence to prove or clarify whether the driver or a supplier/manufacturer that supplies the autonomous driving control is responsible for the accident may be clarified using as evidence data. Accordingly, a supplier/manufacture of the autonomous driving control can clear away a false charge of an accident occurred due to a malfunction of the autonomous driving vehicle, and can be relieved of its responsibility for accidents that may occur in preparation for the commercialization of an autonomous driving vehicle.

The aforementioned apparatus may be implemented in the form of a combination of hardware elements, software elements and/or hardware elements and software elements. For example, the apparatus and its elements described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, code, an instruction or one or more combinations of them and may configure the processing device so that it operates as desired or may instruct the processing device independently or collectively. The software and/or data may be interpreted by the processing device or may be embodied in a machine, component, physical device, virtual equipment or computer storage medium or device of any type or a transmitted signal wave permanently or temporarily in order to provide an instruction or data to the processing device. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter.

According to some exemplary embodiments of the present disclosure, an accident avoidance server can solve loose ends in autonomous drive by controlling an autonomous driving vehicle based on information associated with a driving pattern of a driver generated based on training data obtained while the server trains the driver through a tutorial.

According to certain exemplary embodiments of the present disclosure, an accident avoidance server can clarify where the responsibility for an accident lies when the accident occurs during the autonomous driving control of an autonomous driving vehicle because the server controls autonomous driving based on information about the driving pattern of a driver. Furthermore, in some exemplary embodiments of the present disclosure, a supplier or manufacturer of an autonomous driving vehicle or autonomous driving software/system can check or prove where the responsibility for damage lies.

According to certain exemplary embodiments of the present disclosure, an accident avoidance server can provide or submit evidence data for legal prevarication and a specific situation when an accident occurs during the autonomous driving control of an autonomous driving vehicle.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of controlling an autonomous driving vehicle, the method performed by a processor, comprising:
executing a tutorial configured to perform training of a driver through a virtual situation for recognizing a driving pattern of the driver;
obtaining training data when the tutorial performs the training of the driver;
storing information associated with the driving pattern of the driver based on the obtained training data; and
controlling autonomous driving of the autonomous driving vehicle based on the information associated with the driving pattern of the driver.

2. The method of claim 1, further comprising providing information related to the autonomous driving controlled based on the stored information associated with the driving pattern of the driver when the autonomous driving vehicle has an accident.

3. The method of claim 1, wherein controlling the autonomous driving comprises:
    extracting the stored information associated with the driving pattern of the driver obtained through the tutorial when surrounding situations are recognized through the autonomous driving vehicle; and
    controlling the autonomous driving vehicle based on the extracted information associated with the driving pattern.

4. The method of claim 3, wherein controlling the autonomous driving comprises:
    calculating collision prediction information between the autonomous driving vehicle and at least one other vehicle around, ahead of or behind the autonomous driving vehicle; and
    controlling speed of the autonomous driving vehicle based on the calculated collision prediction information to maintain a specific distance from the at least one other vehicle.

5. The method of claim 1, wherein controlling the autonomous driving comprises:
    sensing whether the driver manually drives the autonomous driving vehicle; and
    controlling the autonomous driving vehicle according to control data generated based on manual driving of the driver.

6. The method of claim 1, wherein storing the information associated with the driving pattern of the driver comprises:
    estimating reference data of the training data from the tutorial; and
    storing the information associated with the driving pattern of the driver based on the estimated reference data.

7. The method of claim 1, wherein executing the tutorial comprises:
    generating the virtual situation by producing at least one scenario for recognizing the driving pattern of the driver; and
    reproducing the generated virtual situation.

8. The method of claim 7, wherein executing the tutorial comprises reproducing the virtual situation based on augmented reality or virtual reality through a display installed on the autonomous driving vehicle or associated with the autonomous driving vehicle.

9. The method of claim 8, wherein executing the tutorial comprises executing the virtual situation when the autonomous driving vehicle is determined to be in a non-driving state.

10. The method of claim 1, wherein executing the tutorial comprises:
    providing question information for recognizing the driving pattern of the driver as the tutorial; and
    receiving an answer related to the question information from the driver.

11. The method of claim 1, wherein executing the tutorial comprises providing a driving situation in which the autonomous driving vehicle is driven on a road in real time as the tutorial.

12. The method of claim 1, wherein executing the tutorial comprises executing the tutorial when authentication on the driver is performed based on identification information of the driver.

13. A computer program stored in a non-transitory computer-readable recording medium to execute a method of controlling an autonomous driving vehicle, the method comprising:
    executing a tutorial configured to perform training of a driver through a virtual situation for recognizing a driving pattern of the driver;
    obtaining training data when the tutorial performs training of the driver;
    storing information associated with the driving pattern of the driver based on the obtained training data; and
    controlling autonomous driving of the autonomous driving vehicle based on the information associated with the driving pattern of the driver.

14. An apparatus of controlling an autonomous driving vehicle, comprising:
    one or more processors; and
    memory storing executable instructions that, if executed by the one or more processors, configure the one or more processors to:
    execute a tutorial configured to perform training of a driver through a virtual situation for recognizing a driving pattern of the driver;
    obtain training data when the tutorial performs training of the driver;
    store the information associated with the driving pattern of the driver based on the obtained training data; and
    control autonomous driving of the autonomous driving vehicle based on the information associated with the driving pattern of the driver.

15. The apparatus of claim 14, wherein the one or more processors are configured to provide information related to the autonomous driving controlled based on the stored information associated with the driving pattern of the driver when the autonomous driving vehicle has an accident.

16. The apparatus of claim 14, wherein the one or more processors are configured to:
    extract the information associated with the driving pattern of the driver obtained through the tutorial when surrounding situations are recognized through the autonomous driving vehicle; and
    control the autonomous driving vehicle based on the extracted information associated with the driving pattern.

17. The apparatus of claim 14, wherein the one or more processors are configured to:
    generate the virtual situation by producing at least one scenario for recognizing the driving pattern of the driver; and
    reproduce the generated virtual situation.

18. The apparatus of claim 14, wherein the one or more processors are configured to:
    provide question information for recognizing the information associated with the driving pattern of the driver as the tutorial; and
    receive an answer related to the question information from the driver.

19. The apparatus of claim 14, wherein the one or more processors are configured to provide a driving situation in which the autonomous driving vehicle is driven on a road in real time as the tutorial.

20. The apparatus of claim 14, wherein the one or more processors are configured to execute the tutorial when authentication on the driver is performed based on identification information of the driver.

\* \* \* \* \*